April 28, 1931.  P. C. MARIE  1,803,197
WALKING TOY
Filed Oct. 2, 1929
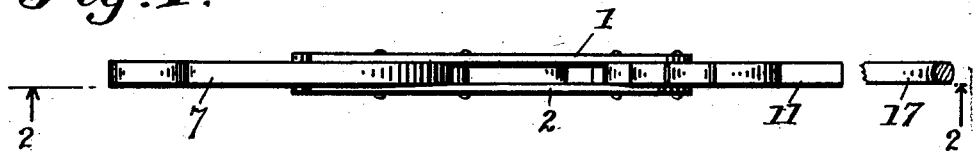
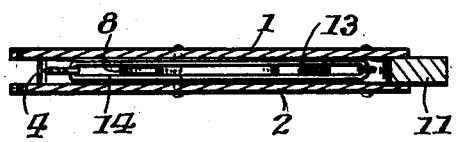
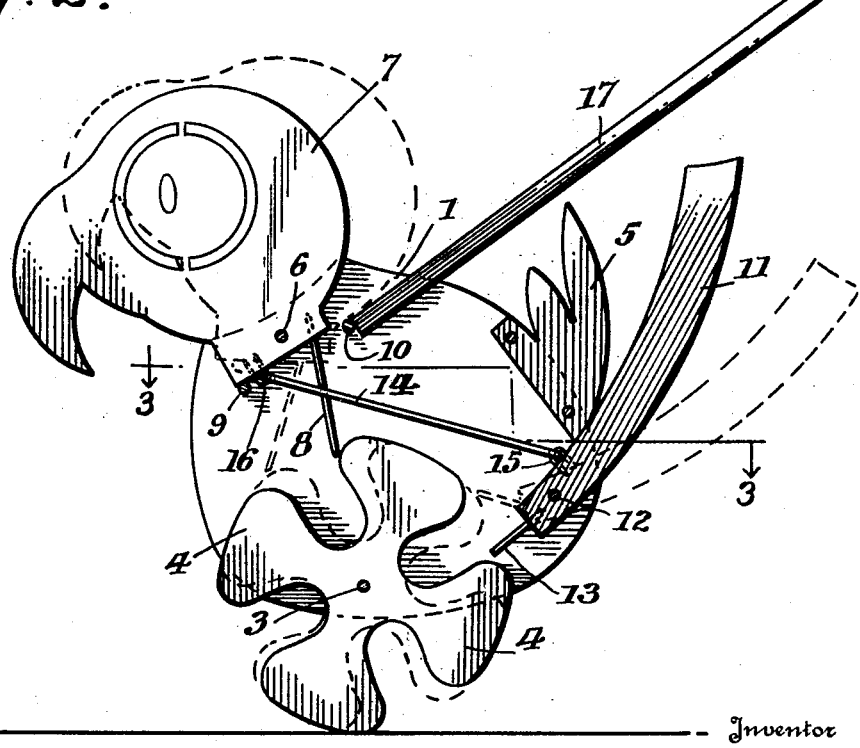
Inventor
Peter C. Marie
By Jacobi & Jacobi
Attorneys Patented Apr. 28, 1931

1,803,197

UNITED STATES PATENT OFFICE

PETER C. MARIE, OF PITTSBURGH, PENNSYLVANIA

WALKING TOY

Application filed October 2, 1929. Serial No. 396,793.

This invention relates to new and useful improvements in toys and more particularly to what may be termed a walking toy, the primary object of the invention being to provide a device of this character which will be extremely attractive and amusing to children and which may, if desired, be utilized for advertising purposes.

A further object of the invention resides in providing a device of the character mentioned provided with movable parts, representative of movable elements of an animal or fowl which movable parts are actuated automatically as the toy is propelled over the surface of the ground.

Still another object of the invention resides in providing a traction wheel designed to give the impression of feet of an animal or fowl represented by the design which traction wheel is adapted to contact intermittently with portions of the movable elements whereby said movable elements are actuated.

A still further object resides in connecting the movable elements of the device together by means of an elastic band, so that while said movable elements may be actuated by the traction or rotating wheel, said elements will also be actuated in unison.

A still further object resides in providing a device which is simple and durable in construction, extremely inexpensive to manufacture and one which will be very efficient in use and amusing.

With these and numerous other objects in view, my invention consists in the novel features of construction, combination and arrangement of parts as will be hereinafter referred to and more particularly pointed out in the specification and claims.

In the accompanying drawing forming a part of this application,

Figure 1 is a plan view of a device constructed in accordance with my invention, parts being disclosed in section.

Figure 2 is a vertical section therethrough as seen on the line 2—2 of Figure 1, and Figure 3 is a horizontal section as seen on the line 3—3 of Figure 2.

In describing the invention I shall refer to the drawing in which similar reference characters designate corresponding parts throughout the several views and in which 1 and 2 designates the side plates constituting a body, the same being arranged in spaced relation and designed to represent the body of a bird, although it will be understood that the body may be designed to represent any animal or fowl or any other desired animated device. A pin 3 passing through the plates 1 and 2 adjacent the lower edges thereof forms a pivot for a wheel which is cut-out in such fashion as to provide the four projections 4, the outer ends of said projections being somewhat enlarged to represent feet of the bird represented by the body, said wheel being capable of rotation on the pin 3. Secured between the plates 1 and 2 forming the body at the rear thereof is a tail piece 5 which is permanently secured in place and represents feathers of the bird depicted by this general design.

Pivoted on a pin 6 extending through the plates 1 and 2 adjacent the upper forward ends thereof is a head member 7 which may be of any desired design but which in the present instance represents the head of a parrot. Secured to the lower end of the head piece 7 to one side of the pivot 6 and projecting into the rotative path of the wheel is a wire or leaf spring 8 so that said head member 7 may be oscillated on its pivot 6 as the wheel is rotated. In order to limit the movement of the head member 7 I provide the stop pins 9 and 10 on opposite sides and slightly below the pivot 6.

A movable tail member 11 of elongated design is provided which is mounted on a pivot pin 12 secured between the plates 1 and 2 adjacent the lower rear ends thereof. The pivot is secured to the tail 11 adjacent one end thereof and the extreme inner free end of said tail has secured thereto a wire or leaf spring projection 13 which also projects into the rotative path of the wheel, as clearly shown in Figure 2 of the drawing. Thus, when the wheel is rotated contact will be made with the projection 13 to oscillate the tail member 11 on its pivot 12. The position taken by the tail member 11 through such oscillation and also the oscillating movement of the head member 7 is clearly disclosed in dotted lines in Figure 2 of the drawing.

It will be seen from the foregoing that the head and tail will be oscillated by the rotation of the wheel member of the device as the latter is propelled forwardly or rearwardly. As stated in the objects of the invention it is my desire also to connect these movable elements so as to operate the same in unison and in opposite directions. To this end I provide an elastic band 14 which has one end connected as shown at 15 to the tail 11 on the side of the pivot 12 opposite that carrying the projection 13 and the opposite end of said elastic band is connected as shown at 16 to the lower end of the head member 7 on the opposite side of the pivot 6 to which the projection 8 is connected. Thus, when the tail member 11 is oscillated in the one direction by the action of the wheel, the tendency will be to draw the head member 7 to an opposite position through the action of this elastic band 14. As the device is propelled over the surface of the ground, obviously the head and tail members will be continuously oscillated giving an attractive and amusing effect to children and others who may be interested. The tail piece 5, previously described, is mounted on the device just above the tail member 11 and acts as a stop for the upward movement of said member 11, as appears obvious from the showing in Figure 2 of the drawing.

In order to assist in the propulsion of the device over the surface of the ground, I provide an elongated handle member 17 which is adapted to fit snugly under friction between the two sides plates 1 and 2 forming the body of the device. If applied in the proper position, the lower end of the handle member 17 may abut the stop pin 10, as shown in Figure 2 of the drawing, so that it will not contact with any of the movable elements of the device to damage the same.

The various pins shown and described in connection with this invention may be in the form of cotter pins if desired, so that the device may be dissembled or assembled at will, but for purposes of economy and permanent construction, pins or nails for permanent use are probably preferable.

From the foregoing description and construction of my improved toy, the manner of assembling the same and the operation thereof will be readily understood and it will be seen that I have provided a simple, inexpensive and efficient means for carrying out the objects of the invention.

While I have particularly described the elements best adapted to perform the functions set forth, it is obvious that various changes in form, proportion and in the minor details of construction, as well as design, may be resorted to, without departing from the spirit or sacrificing any of the principles of the invention.

Having thus described my invention what I claim is:

1. In a toy of the class described, a body member comprising a pair of spaced side plates, a traction wheel rotatably mounted therebetween and provided with projections designed to form feet for said body member, a head member pivotally mounted between said side plates and having a projection thereon on one side of its pivot disposed in the path of the projections of said wheel, whereby said head member is actuated in one direction as the wheel is rotated, a tail member pivoted between said side plates and disposed on the opposite side of the vertical plane of the axis of said wheel, a projection on said tail member disposed in the path of the projections of said wheel, whereby said tail member is actuated in one direction as the wheel is rotated, an elastic band connecting the tail member and head member together, said elastic band being engaged with said tail and head members on opposite sides of the pivot points from which the projections of the head and tail members extend, tending to draw said tail and head members in directions opposed to that to which they are disposed by the action of said wheel, and means for stopping the pivotal action of said tail and head member.

2. In a toy of the class described, a body member comprising a pair of spaced plates, a traction wheel rotatably mounted between said plates and having projections thereon representative of feet for said body, head and tail members pivoted between the plates of said body on opposite sides of the vertical plane of the axis of said wheel, means on said head and tail members, respectively, disposed in the path of the projections on said wheel, whereby to actuate said tail and head members upon the rotation of said wheel, an elastic connection between said head and tail members tending to draw the same respectively in directions opposed to that caused by the action of the wheel, means between the plates of the body limiting the movement of said head and tail members in certain directions and a handle member removably and frictionally held between said plates of the body whereby the toy may be pushed over the surface of the ground.

In testimony whereof I affix my signature.

PETER C. MARIE.